Feb. 28, 1967    F. L. CHRISTENSEN ETAL    3,306,669
DIAMOND MILLING CUTTERS
Filed Feb. 17, 1964    2 Sheets-Sheet 1
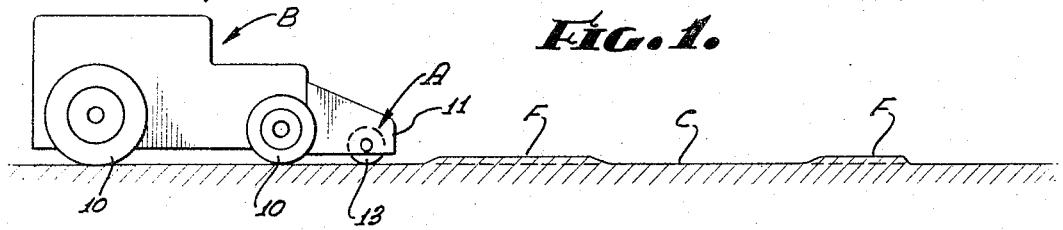
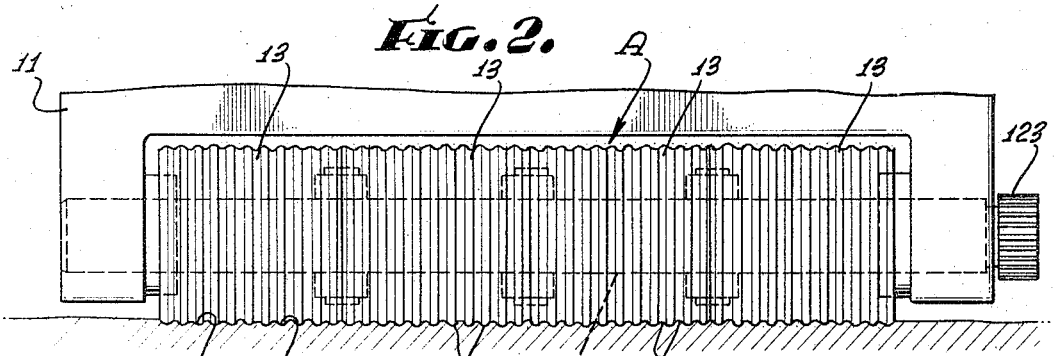
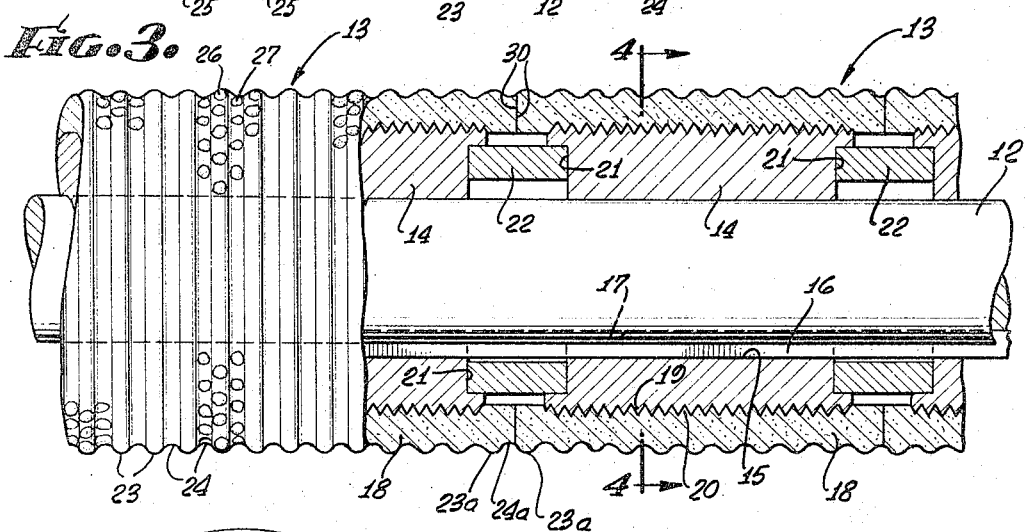
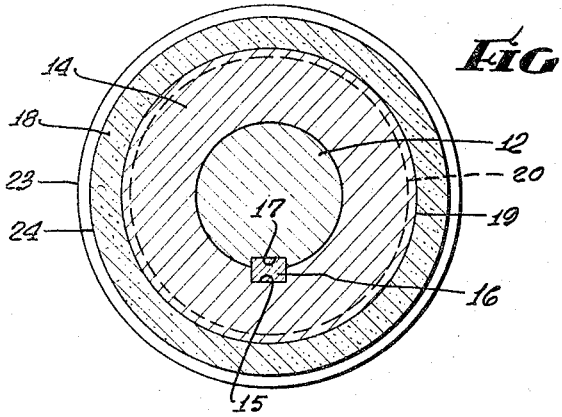
INVENTORS:
DONALD H. MABEY
FRANK L. CHRISTENSEN
BY
Bernard Kriegel
ATTORNEY.

United States Patent Office 3,306,669
Patented Feb. 28, 1967

3,306,669
DIAMOND MILLING CUTTERS
Frank L. Christensen and Donald H. Mabey, Salt Lake City, Utah, assignors to Christensen Diamond Products Company, Salt Lake City, Utah, a corporation of Utah
Filed Feb. 17, 1964, Ser. No. 345,425
16 Claims. (Cl. 299—89)

The present invention relates to mills or milling cutters particularly useful for removing concrete or other material from which a highway or airstrip is constructed.

Concrete highways or airstrips may have smooth surface regions that are undesirable to the safe travel of vehicles thereon, especially under inclement weather conditions, which render such smooth surfaces slippery. A good gripping surface can be provided when the highway or airstrip is laid originally. However, the removal of bumps or other irregularities in the vehicle supporting structure might result in the undesirable smooth regions.

An object of the present invention is to provide a rotatable diamond milling cutter capable of producing a good roughened gripping surface on a highway, airstrip, and the like.

Another object of the invention is to provide a rotatable diamond milling cutter capable of producing small parallel ridges in an airstrip or highway surface running lengthwise thereof so as to stabilize aircraft in taking off from or landing on the airstrip, or to enhance the control of automobiles and other vehicles traversing the highway.

A further object of the invention is to provide a rotatable diamond milling cutter for removing bumps and other irregularities from the surfaces of highways, aircraft landing strips, and the like.

An additional object of the invention is to provide a rotatable diamond milling cutter for removing bumps and other irregularities from the surfaces of highways, aircraft landing strips, and the like, and for simultaneously producing parallel ridges on such surfaces to enhance their vehicle gripping properties.

Yet another object of the invention is to provide a rotatable diamond milling cutter adapted to be placed in assembled relation to like milling cutters to produce substantially uniformly spaced parallel stabilizing ridges simultaneously along a relatively wide portion of a concrete highway or aircraft landing strip.

Still a further object of the invention is to provide a rotatable diamond milling cutter for producing parallel ridges in a surface, such as in a concrete highway or aircraft landing strip, which enables the cuttings that it produces to be flushed away readily by water or other flushing fluid, and which can be maintained in a clean and relatively cool state by the flushing fluid.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURE 1 is a diagrammatic view of a milling cutter assembly mounted on a machine for performing a cutting operation on a highway, aircraft landing strip, or the like;

FIG. 2 is an elevational view of a cutter assembly mounted in the machine;

FIG. 3 is an enlarged combined longitudinal section and elevational view of a portion of the cutter assembly disclosed in FIG. 2, and a part of the mechanism for rotating it;

FIG. 4 is a section taken along the line 4—4 on FIG. 3;

Figure 5:
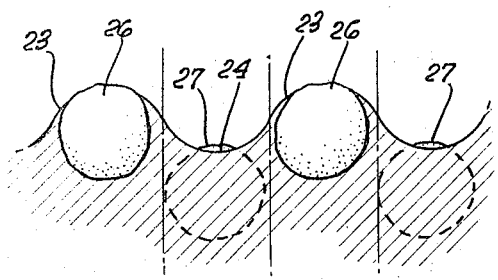
FIG. 5 is an enlarged fragmentary section through a portion of a cutter member.
Figure 6:
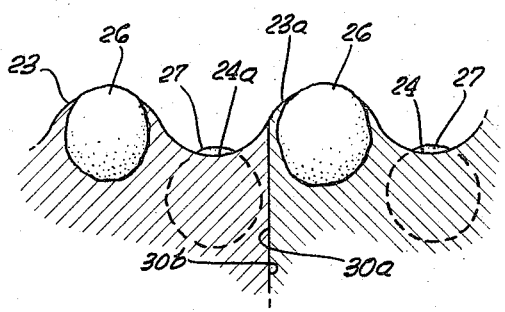
FIG. 6 is an enlarged fragmentary section through the end abutting portions of a pair of cutter members.
Figure 7:
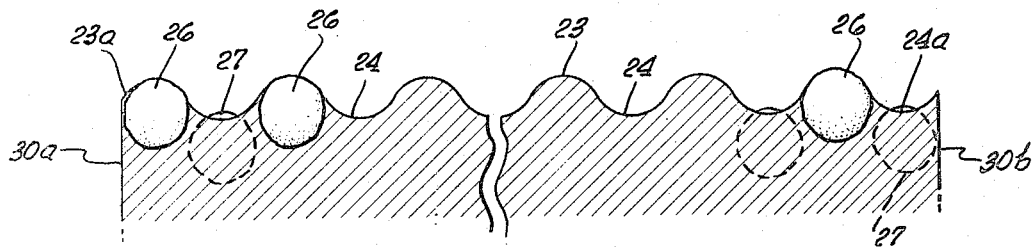
FIG. 7 is an enlarged section through one of the cutter members, including its opposite end portions.

As disclosed in the drawings, a cutter assembly A is appropriately mounted in a machine B capable of rotating the assembly at an appropriate speed while the machine moves the rotating assembly along a suitable roadway C, such as a highway or aircraft landing strip, made of concrete or other suitable material. As disclosed somewhat diagrammatically in FIG. 1, the machine B may comprise a suitable vehicle having forward and rear road engaging wheels 10, the cutter assembly being appropriately mounted for rotation in performing a cutting action on the concrete surface. Although not forming any part of the present invention, the machine will usually provide a mechanism for adjusting the vertical position of the cutter assembly A, even to the point of elevating it from engagement with the roadway.

The machine B includes a suitable supporting frame 11, the cutter assembly being rotatably mounted in such frame and being rotatable by a suitable mechanism (not shown). As shown, the cutter assembly A includes a drive shaft or spindle 12 suitably rotatably mounted in the supporting frame 11 and to which the cutter members or sections 13 are secured. The cutter members may be identical to one another, each including an annular hub 14, that can be made of steel, for example, and through which the drive shaft passes, this hub having an internal longitudinal keyway 15 receiving a key 16 that also extends into a longitudinal external keyway 17 in the drive shaft or spindle 12. A generally cylindrical matrix body 18 is cast on the outer portion of the steel hub 14, being secured thereto by means of the interlocking external and internal ribs 19, 20 provided on the hub and matrix body, respectively. Each end of the steel hub has a counterbore 21 therein adapted to receive a spacer ring or washer 22, which may be made of steel, the drive shaft 12 passing through the spacers. Mounted on the drive shaft is a suitable gear 123, or the like, by means of which the entire cutter assembly A is rotated at the appropriate speed from the driving mechanism (not shown) mounted in and forming part of the machine B. Each spacer 22 has a particular width or thickness, to insure the appropriate juxtaposed relation between adjacent cutters 13, 13 when the entire cutter assembly is mounted on and fixed to the drive shaft 12.

As shown in the drawings, the generally cylindrical matrix body 14 has axially spaced parallel circular ridges 23 of matrix material formed thereon, the parallel ridges being separated by circumferentially continuous parallel grooves or troughs 24. Each ridge 23 and trough 24 is normal to the axis of rotation of the cutter member or section 13, so that each ridge is capable of cutting a groove 25 in the surface of the roadway. Each ridge has circumferentially spaced diamond cutting elements 26 embedded therein for performing a cutting action in the roadway. Similarly, each trough or groove portion 24 between adjacent ridges has circumferentially spaced diamond cutting elements 27 embedded therein, these diamond cutting elements 27 preferably being in staggered relation with respect to the diamond cutting elements 26 in the adjacent ridge or ridges 23. The width of the path traversed by the diamond cutting elements 26 in a ridge might be closely adjacent to or may overlap the width of the path traversed by the diamond cutting elements 27 in an adjacent groove 24. However, there may be a separation between the paths without interfering with the effectiveness of the rotatable cutter member or section 13 to cut the concrete or other work, inasmuch as the concrete not operated upon by diamond elements in adjacent groove or ridge portions of the cutter member will be relatively thin and will readily break off.

Only a single milling cutter 13 can be used, or a plurality of such cutters can be mounted in endwise relation to one another, as illustrated in the drawings, depending upon the width of the cut to be taken in the surface C. As an example, the cutter members 13 can be mounted on the drive shaft or spindle 12 to cut a path of about 1 to 5 feet in width during the progress of the machine B along the highway or aircraft landing strip C. The cutter assembly A is mounted on the drive shaft 12 and suitably clamped to one another through the intervening spacer rings or washers 22, which maintain their adjacent ends 30 close to one another, such that the substantially abutting ends 30 of a pair of adjacent cutter members 13, 13 together form a circumferential groove or trough 24a between their adjacent end parallel ridges 23a.

The vehicle B is moved along the highway or landing strip C at an appropriate speed and the cutters 13 rotated at an appropriate speed, which may, for example, be about 1,000 r.p.m. The machine is appropriately manipulated to engage the cutters 13 with the highway or landing strip and take the desired depth of cut. Water or other suitable flushing fluid is pumped against the surface of the roadway and the adjacent periphery of the cutter assembly A to clean the cuttings from the working region of the milling cutters 13 and to maintain the latter in a clean and cool condition. The circumferential grooves or troughs 24 between the ridges 23 provide parallel waterways around the periphery of each cutter through which the cuttings can be flushed away from the cutting region. They also enable the flushing fluid to contact all portions of the ridges 23 and the grooves 24 to clean and maintain them free from cuttings, and to cool all regions of the matrix 14 and diamonds 26, 27, so that they are at all times at their maximum effectiveness for producing a cutting action in the work or roadway C. During the progress of the rotatable cutters 13 along the roadway, they will cut parallel ridges and grooves in the surface of the roadway, preferably in the direction of travel of the automobiles, airplanes, or other vehicles, thereon, providing a good gripping surface and insuring the stabilized movement of the vehicle along the highway or landing strip. Of course, if desired, the ridges and intervening grooves could be cut transversely of the surface C, or in another direction.

The cutter members or sections 13 can be alike, the opposite ends 30 of each cutter being parallel to one another and normal to its axis of rotation. One end 30a of a cutter member may terminate at the end of its ridge portion 23a and its opposite end 30b may terminate at the end of its groove or trough portion 24a. With this arrangement, the diamond cutting elements or stones 26 in an end ridge 23a will be substantially flush with one end 30a of the cutter and the circumferentially spaced diamond cutting elements 27 in the trough 24a at the other end of the cutter member will be substantially flush with the opposite end 30b of the cutter member. Thus, when the trough end 30b of one cutter member is assembled adjacent to the ridge end 30a of another cutter member, with the appropriate spacer ring or washer 22 therebetween, the adjacent cutter members will collectively form a trough portion 24a therebetween in which diamonds 27 are set fully in their appropriate locations, such trough portion, in effect, forming a continuation between the ridges 23a on opposite sides thereof of adjacent cutter members 13, 13 in much the same fashion as a trough or groove 24 is provided between adjacent ridges 23 at an intermediate location of a single cutter member.

Figure 8:
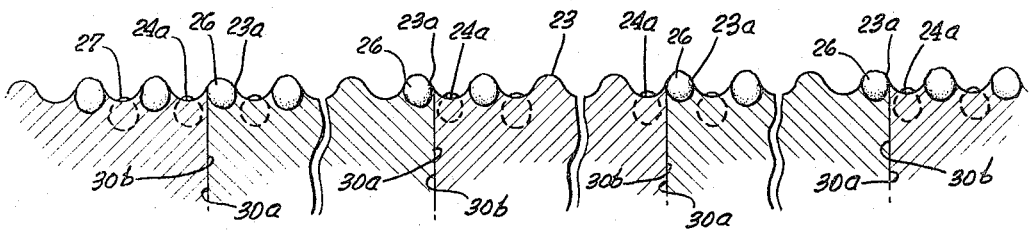
FIG. 8 is an enlarged section through a plurality of abutting cutter members having modified end configurations.

If desired, alternate cutter members may be provided whose ends 30a terminate at the portion where the end ridges 23a begin merging into the trough portion, and the intervening cutter members may terminate at end portions 30b where the end grooves 24a would begin merging into a ridge, with diamond cutting elements 26, 27 being set flush in the end ridges 23a and end groove portions 24a of the respective cutter members (FIG. 8). When cutter members having such end ridges 23a are mounted on the shaft 12 in alternate relation with cutter members having such end grooves 24a, an assembly of cutter members or sections 13 will be provided in which opposed ridges 23 at the ends of adjacent cutter members 13, 13 merge smoothly into an intervening trough portion 24, with circumferentially spaced diamond cutting elements 27, 26 disposed in the combined groove 24 and in the adjacent ridges 23 in much the same manner as diamond cutting elements 26, 27 are embedded in the ridges 23 and intervening grooves 24 of a single cutter member 13.

The rotating cutter member 13, or member assembly A, can provide parallel ridges and grooves in any surface C. They can also be used for eliminating bumps F or other irregularities in the surface of the roadway. If a high spot or bump is present in the roadway, the rotation of the cutter assembly A at the proper speed and movement of the machine B over the bump area F will cause the cutter assembly to cut away the bump or elevated portion and bring it down to the desired level. During such cutting action on the bump or other irregularity to remove it, the cutter members 13 simultaneously form the desired parallel ridges in its surface.

We claim:

1. In a milling cutter: a unitary body adapted to be rotated about an axis, said body comprising axially spaced circumferential ridges extending around its periphery and disposed normal to the body axis; and individual diamond cutting elements spaced circumferentially from each other in a predetermined pattern and embedded in said ridges; said diamond cutting elements in each ridge being exposed in a direction laterally outwardly of such ridge to perform a cutting action on material disposed outwardly of the periphery of such ridge.

2. In a milling cutter: a generally cylindrical unitary body adapted to be rotated about an axis, said body comprising axially spaced circumferential ridges extending around its periphery and disposed normal to the body axis, said body having shallow circumferential grooves between said ridges; diamond cutting elements embedded in said ridges; and diamond cutting elements embedded in said body at the base of each groove.

3. In a milling cutter: a body adapted to be rotated about an axis and having axially spaced circumferential ridges extending around its periphery and disposed normal to the body axis, said body having circumferential grooves between said ridges; diamond cutting elements spaced circumferentially from each other and embedded in said ridges; diamond cutting elements spaced circumferentially from each other and embedded in said body at the base of each groove; the diamond elements at the base of each groove being in staggered relation to the diamond elements in adjacent ridges circumferentially around said body.

4. In a milling cutter: a generally cylindrical body adapted to be rotated about its axis and having axially spaced circumferential ridges of substantially the same radius extending around its periphery in parallel relation to each other and disposed normal to the body axis; and diamond cutting elements spaced circumferentially from each other in a predetermined pattern and embedded in said ridges.

5. In a milling cutter: a generally cylindrical body adapted to be rotated about its axis and having axially spaced circumferential ridges of substantially the same radius extending around its periphery in parallel relation to each other and disposed normal to the body axis, said ridges defining circumferential grooves therebetween; diamond cutting elements spaced circumferentially from each other in a predetermined pattern and embedded in said ridges; and diamond cutting elements spaced circumferentially from each other in a predetermined pattern and embedded in said body at the base of each groove.

6. In a milling cutter: a generally cylindrical body adapted to be rotated about its axis and having axially spaced circumferential ridges of substantially the same radius extending around its periphery in parallel relation to each other and disposed normal to the body axis, said ridges defining circumferential grooves therebetween; diamond cutting elements spaced circumferentially from each other and embedded in said ridges; diamond cutting elements spaced circumferentially from each other and embedded in said body at the base of each groove; the diamond elements at the base of each groove being in staggered relation to the diamond elements in adjacent ridges circumferentially around said body.

7. In a milling cutter: a unitary body adapted to be rotated about an axis, said body comprising axially spaced circumferential ridges extending around its periphery and disposed normal to the body axis; individual diamond cutting elements embedded in each ridge and spaced circumferentially from each other around each ridge; said diamond cutting elements in each ridge being exposed in a direction laterally outwardly of such ridge to perform a cutting action on material disposed outwardly of the periphery of such ridge; the end faces of said body being normal to said body axis; and individual diamond cutting elements embedded in the periphery of said body substantially flush with each of said end faces and spaced circumferentially from each other around each of said end faces.

8. In a milling cutter: a generally cylindrical body adapted to be rotated about its axis and having axially spaced circumferential ridges of substantially the same radius extending around its periphery in parallel relation to each other and disposed normal to the body axis; individual diamond cutting elements embedded in each ridge and spaced circumferentially from each other around each ridge; the end faces of said body being normal to said body axis; and individual circumferentially spaced diamond cutting elements embedded in the periphery of said body substantially flush with each of said end faces.

9. In a milling cutter: a generally cylindrical body adapted to be rotated about its axis and having axially spaced circumferential ridges of substantially the same radius extending around its periphery in parallel relation to each other and disposed normal to the body axis, said ridges defining circumferential grooves therebetween; diamond cutting elements spaced circumferentially from each other and embedded in said ridges; diamond cutting elements spaced circumferentially from each other and embedded in said body at the base of each groove; the diamond elements at the base of each groove being in staggered relation to the diamond elements in adjacent ridges circumferentially around said body; the end faces of said body being normal to said body axis; and circumferentially spaced diamond cutting elements embedded in the periphery of said body substantially flush with each of said end faces.

10. In a milling cutter: a supporting hub; a unitary matrix body surrounding and secured to said hub to rotate therewith; said matrix body having axially spaced circumferential matrix ridges extending around its periphery and disposed normal to the matrix body axis; and individual diamond cutting elements embedded in each ridge and spaced circumferentially from each other around each ridge; said diamond cutting elements in each ridge being exposed in a direction laterally outwardly of such ridge to perform a cutting action on material disposed outwardly of the periphery of such ridge.

11. In a milling cutter: a supporting hub; a generally cylindrical unitary matrix body surrounding and secured to said hub to rotate therewith; said matrix body having axially spaced circumferential matrix ridges of substantially the same radius extending around its periphery in parallel relation to each other and disposed normal to the body axis; and individual diamond cutting elements embedded in each ridge and spaced circumferentially from each other around each ridge.

12. In a milling cutter: a supporting hub; a generally cylindrical matrix body surrounding and secured to said hub to rotate therewith; said matrix body having axially spaced circumferential ridges of substantially the same radius extending around its periphery in parallel relation to each other and disposed normal to the body axis, said ridges defining circumferential grooves therebetween; diamond cutting elements spaced circumferentially from each other and embedded in said ridges; diamond cutting elements spaced circumferentially from each other and embedded in said body at the base of each groove; the diamond elements at the base of each groove being in staggered relation to the diamond elements in adjacent ridges circumferentially around said body; the end faces of said body being normal to said body axis; and circumferentially spaced diamond cutting elements embedded in the periphery of said body substantially flush with each of said end faces.

13. In milling apparatus: a plurality of rotatable axially aligned milling cutters, each cutter comprising a generally cylindrical unitary body adapted to be rotated about its axis, each body comprising axially spaced circumferential ridges of substantially the same radius extending around its periphery in parallel relation to each other and disposed normal to the body axis, and individual diamond cutting elements embedded in each ridge and spaced circumferentially from each other around each ridge; and means securing said cutters to each other in endwise contiguity with the opposed end ridges of cutters spaced from each other to provide a circumferential groove therebetween.

14. In milling apparatus: a plurality of aligned milling cutters rotatable about an axis; each cutter including a generally cylindrical unitary body adapted to be rotated about its axis, each body comprising axially spaced circumferential ridges of substantially the same radius extending around its periphery in parallel relation to each other and disposed normal to the body axis, individual diamond cutting elements embedded in each ridge and spaced circumferentially from each other around each ridge, the end faces of said body being normal to said body axis, individual diamond cutting elements embedded in the periphery of said body substantially flush with each of said end faces and spaced circumferentially from each other around each of said end faces; and means securing said cutters to each other in endwise contiguity with opposed end ridges of cutters spaced from each other to provide a circumferential groove therebetween.

15. In a milling cutter: a generally cylindrical unitary matrix body adapted to be rotated about its axis and having axially spaced circumferential ridges of matrix material of substantially the same radius extending around its periphery in parallel relation to each other and disposed normal to the body axis; and individual diamond cutting elements embedded in each ridge and spaced circumferentially from each other around each ridge.

16. In a milling cutter: a generally cylindrical unitary matrix body adapted to be rotated about its axis and having axially spaced circumferential ridges of matrix material of substantially the same radius extending around its periphery in parallel relation to each other and disposed normal to the body axis, said ridges defining circumferential grooves therebetween; individual diamond cutting elements embedded in each ridge and spaced circumferentially from each other around each ridge; and individual diamond cutting elements embedded in said matrix body at the base of each groove and spaced circumferentially from each other around the base of each groove.

References Cited by the Examiner

UNITED STATES PATENTS

| | | | |
|---|---|---|---|
| 239,515 | 3/1881 | Lechner | 299—89 X |
| 2,136,359 | 11/1938 | Bley et al. | 175—330 |
| 2,268,775 | 1/1942 | Potvin | 175—330 |
| 2,730,848 | 1/1956 | Wallace et al. | 125—39 X |
| 3,037,755 | 6/1962 | Hatcher | 299—39 |

ERNEST R. PURSER, *Primary Examiner.*